(12) United States Patent
Sasaki et al.

(10) Patent No.: US 7,126,832 B2
(45) Date of Patent: Oct. 24, 2006

(54) CONTROLLER FOR POWER CONVERTER

(75) Inventors: Noriaki Sasaki, Tokyo (JP); Akinori Nishihiro, Tokyo (JP); Masakatu Daijou, Tokyo (JP)

(73) Assignee: Mitsubishi Denki Kabushiki Kaisha, Tokyom (JP)

( * ) Notice: Subject to any disclaimer, the term of this patent is extended or adjusted under 35 U.S.C. 154(b) by 691 days.

(21) Appl. No.: 10/432,240

(22) PCT Filed: Jan. 24, 2002

(86) PCT No.: PCT/JP02/00509

§ 371 (c)(1),
(2), (4) Date: May 22, 2003

(87) PCT Pub. No.: WO03/063330

PCT Pub. Date: Jul. 31, 2003

(65) Prior Publication Data
US 2006/0164874 A1 Jul. 27, 2006

(51) Int. Cl.
H02M 7/12 (2006.01)

(52) U.S. Cl. .......... 363/44; 363/89

(58) Field of Classification Search .......... 363/39, 363/44, 84, 89, 125, 127
See application file for complete search history.

(56) References Cited

U.S. PATENT DOCUMENTS

| | | | | |
|---|---|---|---|---|
| 4,730,243 A | * | 3/1988 | Glennon | 363/44 |
| 4,733,340 A | * | 3/1988 | Mase et al. | 363/35 |
| 4,937,719 A | * | 6/1990 | Yamada et al. | 363/39 |
| 5,801,517 A | * | 9/1998 | Borle | 323/207 |
| 5,880,947 A | * | 3/1999 | Imanaka et al. | 363/89 |

FOREIGN PATENT DOCUMENTS

JP  10-174444  6/1998

* cited by examiner

*Primary Examiner*—Adolf Berhane
(74) *Attorney, Agent, or Firm*—Sughrue Mion, PLLC

(57) ABSTRACT

The invention relates to a control unit of an electric power conversion apparatus that can decrease the high-order harmonic content generated by resonance of the inductance component of the primary wiring connecting an AC power supply 20 and the electric power conversion apparatus and a capacitor connected as a filter even if distortion occurs in an input current waveform.

1 Claim, 5 Drawing Sheets

CONTROLLER FOR POWER CONVERTER

TECHNICAL FIELD

This invention relates to a control unit of an electric power conversion apparatus for converting AC power into DC power and supplying the DC power to a load.

BACKGROUND OF THE INVENTION

FIG. 3 is a diagram to show the configuration of an electric power conversion apparatus in a related art described in JP-A-10-174444, for example. In the figure, numeral 20 denotes an AC power supply, numeral 21 denotes a converter section for converting AC power supplied from the AC power supply 20 into DC power, numerals 22a, 22b, 22c, and 22d denote semiconductor switches making up a single-phase bridge circuit as the converter section 21, and numerals 23a, 23b, 23c, and 23d denote diodes connected in inversely parallel to the semiconductor switches 22a, 22b, 22c, and 22d. Numeral 24 denotes a smoothing capacitor connected to a DC side of the converter section 21, and numeral 25 denotes a load. Numeral 26 denotes a filter capacitor and numeral 27 denotes a reactance component of primary wiring for connecting the AC power supply 20 and the electric power conversion apparatus.

Numeral 31 denotes a reactor connected to an AC side of the converter section 21, numeral 32 denotes an AC voltage detector for detecting AC voltage of the AC power supply 20, numeral 33 denotes an AC detector for detecting AC of the AC power supply 20, and numeral 34 denotes a DC voltage detector being connected to both ends of the smoothing capacitor 24, for detecting DC voltage of the smoothing capacitor 24.

The main circuitry of the electric power conversion apparatus in the related art is made up of the converter section 21, the smoothing capacitor 24, the reactor 31, the AC voltage detector 32, the AC detector 33, and the DC voltage detector 34.

Numeral 40 denotes a control unit of the electric power conversion apparatus. The control unit 40 is made up of a DC voltage control section 41, a reference sine wave generation section 42, an AC command value calculation means 43, AC control section 44, a pulse width modulation section 45, and a switch drive section 46.

The AC control section 44 is made up of a subtraction section 47, a proportional calculation section 48, series connection of a band-pass filter (BPF) 49 and a proportional calculation section 50, which are placed in parallel with the proportional calculation section 48, and an addition section 51, to control in a discrete system. The BPF 49 is a band-pass filter with power supply frequency fs as the center frequency for allowing only the power supply frequency component to pass through and removing other frequency components.

The operation of the control unit 40 of the electric power conversion apparatus in the related art will be discussed with reference to FIG. 3.

The DC voltage control section 41 performs proportional integration calculation of deviation between DC voltage command value Vd* set by an output voltage setting device (not shown) and DC voltage detection value Vd# detected by the DC voltage detector 34 as DC voltage supplied to the load 25, and outputs the result as AC amplitude command value 1s*. The reference sine wave generation section 42 outputs reference sine wave sincot having the same period and the same phase as AC voltage detection value Vs# output from the AC voltage detector 32.

The AC command value calculation section 43 multiples the AC amplitude command value 1s* output from the DC voltage control section 41 by the reference sine wave sincot output from the reference sine a wave generation section 42, and outputs the result as AC command value is*.

The AC control section 44 inputs the AC command value is* output from the AC command value calculation section 43 and AC detection value is# detected by the AC detector 33 as AC of the AC power supply 20, and outputs AC voltage command value Vc*.

The pulse width modulation section 45 generates and outputs an on/off signal for performing on/off control of the semiconductor switch 22a, 22b, 22c, 22d making up the converter section 21 based on the command of the AC voltage command value Vc* output from the AC control section 44.

The switch drive section 46 turns on/off the semiconductor switch 22a, 22b, 22c, 22d according to the on/off signal output from the pulse width modulation section 45, thereby converting the AC power supplied from the AC power supply 20 into DC power.

Next, an operation of the AC control section 44 inputting the AC command value is* and the AC detection value is# and outputting the AC voltage command value Vc* will be discussed.

In the AC control section 44, the subtraction section 47 calculates deviation ei between the AC command value is* output from the AC command value calculation section 43 and the AC detection value is# detected by the AC detector 33.

The proportional calculation section 48 with proportional gain Kp multiplies the deviation ei by Kp. The deviation ei is input to the series connection of the BPF 49 and the proportional calculation section 50, which are placed in parallel with the proportional calculation section 48, and the proportional calculation section 50 with proportional gain Kps multiplies a deviation of the deviation ei in the vicinity of the power supply frequency passing through the BPF 49 by Kps.

The addition section 51 adds an output signal provided by multiplying the deviation ei by Kp by the proportional calculation section 48 and an output signal provided by multiplying the deviation of the deviation ei in the vicinity of the power supply frequency passing through the BPF 49 by Kps by the proportional calculation section 50 to obtain the AC voltage command value Vc*.

In the electric power conversion apparatus in the related art, the control unit 40 calculates the AC voltage command value Vc* from the DC voltage command value Vd*, the DC voltage detection value Vd* detected by the DC voltage detector 34 as the DC voltage supplied to the load 25, and the AC detection value is# detected by the AC detector 33 as the AC of the AC power supply 20 as described above and controls the main circuitry of the electric power conversion apparatus, thereby matching the DC voltage and the AC of the electric power conversion apparatus with the DC voltage command value and AC command value, respectively.

FIG. 4 shows the waveform of the AC command value is* output from the AC command value calculation section 43 in the control unit 40 of the electric power conversion apparatus in the related art.

FIG. 5 shows the waveform of the AC detection value is# detected by the AC detector 33, in the control unit 40 of the electric power conversion apparatus in the related art, in which high-order harmonic content superposed on the input current waveform. In the figure, (a) shows the waveform at the normal operation time and (b) shows the waveform when resonance occurs.

A comparison is made between the waveform of the AC command value is* input to the subtraction section 47 of the AC control section 44 and the waveform of the AC detection value is$^{\#}$ according to FIGS. 4 and 5.

Microscopically, the waveform of the AC command value is* output from the AC command value calculation section 43 based on the discrete system control becomes a stepwise waveform changing at every given sampling time as shown in FIG. 4. In contrast, the waveform of the AC detection value is$^{\#}$ detected by the AC detector 33 becomes a continuous waveform with higher response speed than the sampling time of the AC command value is* shown in FIG. 4, as shown in FIG. 5(*a*).

Thus, in the deviation ei between the AC command value is* and the AC detection value is$^{\#}$, calculated by the subtraction section 47, waveform distortion equivalent to the sampling time in the AC command value calculation section 43 based on the discrete system control occurs in the input current waveform.

In the electric power conversion apparatus in the related art, if the primary wiring connecting the AC power supply 20 and the electric power conversion apparatus becomes long and the sampling time in the AC command value calculation section 43 based on the discrete system control and the time constants of the reactance component 27 of the primary wiring and the filter capacitor 26 become equal, even if slight distortion of the input current waveform occurs, the high-order harmonic content generated due to resonance of the inductance component of the primary wiring and the capacitor connected as filter is superposed on the input current waveform and the input current waveform is distorted as shown in FIG. 5(*b*).

The AC control section 44 for control in the discrete system in the related art uses the BPF 49 with the power supply frequency fs as the center frequency. In the configuration wherein the proportional gain in the vicinity of the power supply frequency fs of the discrete system control is increased equivalently by connecting the series connection of the BPF 49 and the proportional calculation section 50 in parallel with the proportional calculation section 48, two paths of the path of the proportional calculation section 48 and the path of the series connection of the BPF 49 and the proportional calculation section 50 are adopted and therefore the harmonic components generated due to the resonance of the inductance component of the primary wiring and the capacitor connected as filter cannot be removed.

Thus, the electric power conversion apparatus in the related art involves a problem of limiting the length of the primary wiring to avoid the resonance of the inductance component of the primary wiring and the capacitor connected as filter.

The invention is intended for solving the problems as described above and it is an object of the invention to provide a control unit of an electric power conversion apparatus that can output stable DC voltage even if the sampling time based on discrete value control and the time constants of the inductance component of the primary wiring and a capacitor connected as a filter become equal.

DISCLOSURE OF THE INVENTION

An electric power conversion apparatus according to the invention has a converter section having semiconductor switches forming a bridge configuration, for converting AC power of an AC power supply into DC power, a smoothing capacitor for smoothing the DC power converted by the converter section, a DC voltage control section for performing discrete system control of DC voltage so that the DC voltage of the smoothing capacitor matches a DC voltage command value, reference sine wave generation section based on discrete system control for outputting a sine wave signal used as reference based on AC voltage of the above-mentioned AC power supply, AC command value calculation section based on discrete system control for multiplying output of the DC voltage control section by output of the reference sine wave generation section and outputting an AC command value, an AC control section for calculating an AC voltage command value based on the AC command value output from the AC command value calculation section and AC of the AC power supply and outputting the AC voltage command value, a pulse width modulation section inputted the AC voltage command value, for generating an on/off signal for turning on/off the semiconductor switch based on continuous control, and a switch drive section for turning on/off the semiconductor switch in accordance with the on/off signal output from the pulse width modulation section, in which the AC control section includes a band-pass filter with a power supply frequency as the center frequency and set to a gain not exceeding 1 with the power supply frequency as the center band, the band-pass filter inputted the AC command value output from the AC command value calculation section, a subtraction section for calculating deviation between a signal passing through the band-pass filter, of the AC command value and the AC of the AC power supply, and a proportional calculation section for inputting the deviation calculated by the subtraction section and calculating an AC voltage command value reducing the deviation to zero by proportional calculation, and the AC control section calculates the AC voltage command value based on continuous control, so that the high-frequency component caused by the effect of the sample time can be removed and resonance causing a high-order harmonic content to occur can be prevented even under the condition that the sample time in the discrete system control to the AC command value calculation section and the time constants of the inductance component of the primary wiring and the capacitor connected as filter become equal.

BEST MODE FOR CARRYING OUT THE INVENTION

First Embodiment

Figure 1:
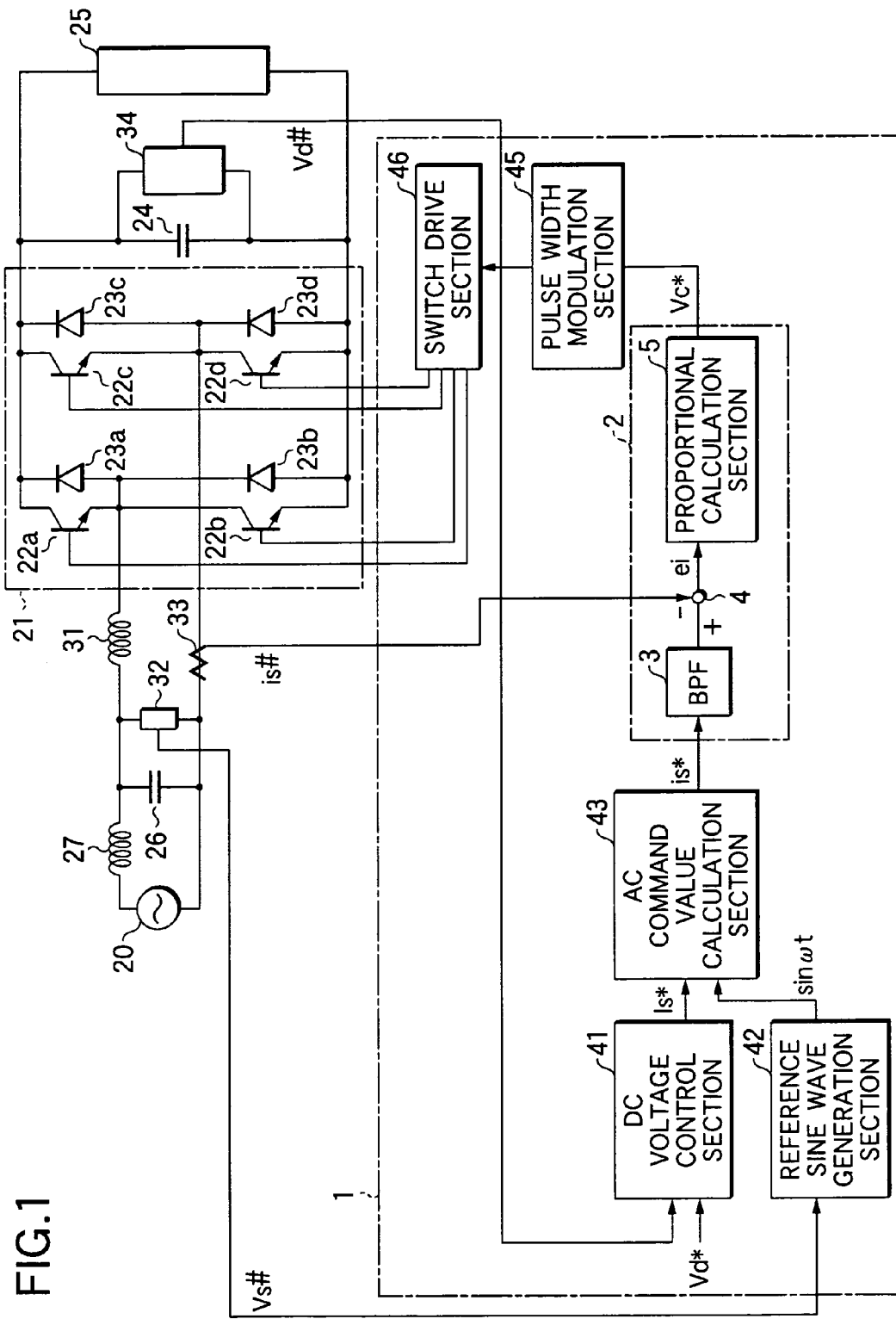
FIG. 1 is a diagram to show the configuration of an electric power conversion apparatus according to a first embodiment of the invention.
Figure 3:
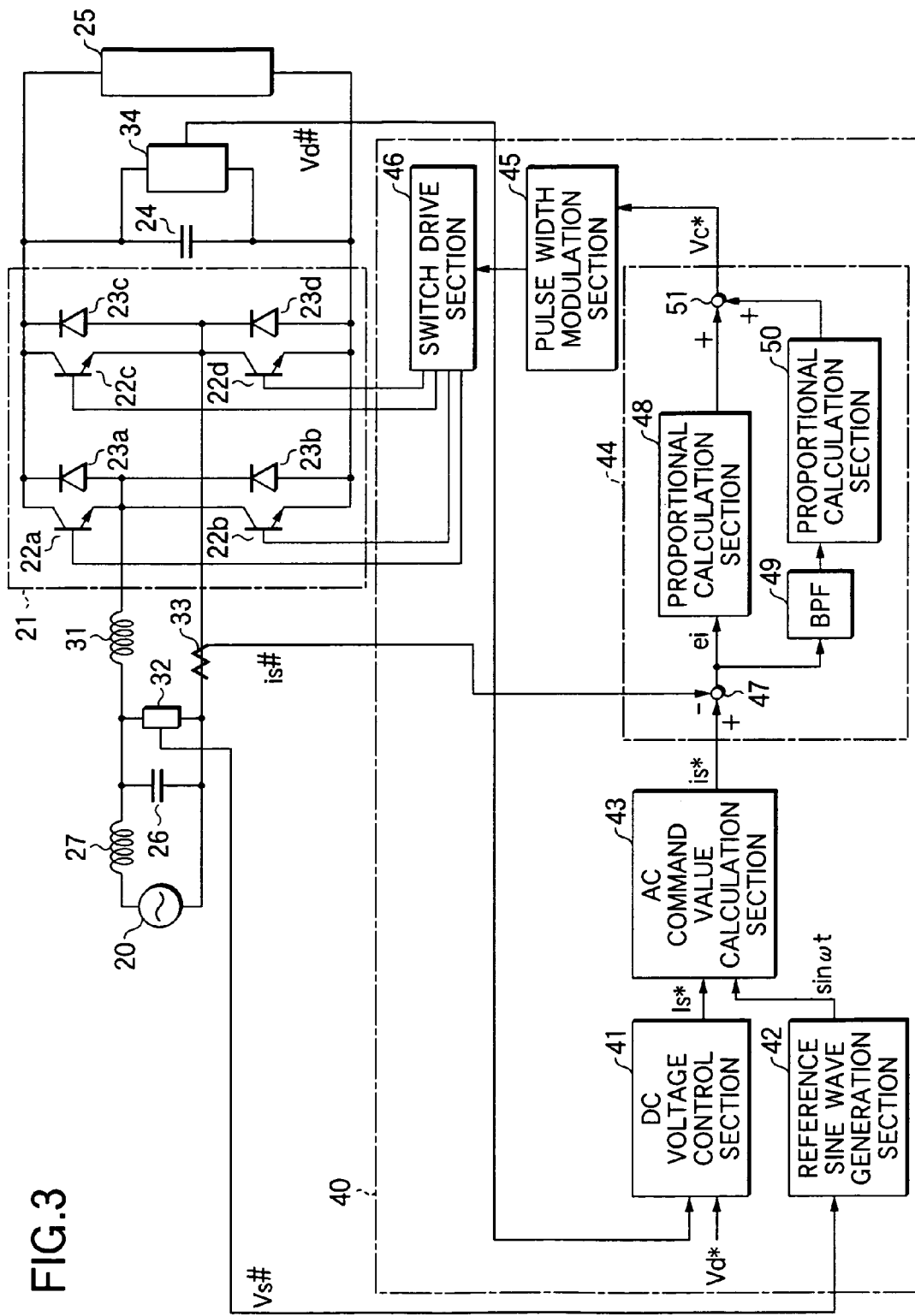
FIG. 3 is a diagram to show the configuration of an electric power conversion apparatus in a related art described in JP-A-10-174444, for example.

FIG. 1 is a diagram to show the configuration of an electric power conversion apparatus according to a first embodiment of the invention. In the figure, numerals 20, 21, 22a to 22d, 23a to 23d, 24 to 27, 31 to 34, 41 to 43, 45, and 46 are similar to those in FIG. 3 and will not be discussed again. Numeral 1 denotes a control unit of the electric power conversion apparatus, numeral 2 denotes an AC control section, numeral 3 denotes a b and-pass filter (BPF) with a power supply frequency as the center frequency and set to a gain not exceeding 1 with the power supply frequency as the center b and, numeral 4 denotes a subtraction section, and numeral 5 denotes a proportional calculation section.

The AC control section 2 in the first embodiment has the BPF 3, the subtraction section 4, and the proportional calculation section 5 connected in series.

Figure 2:
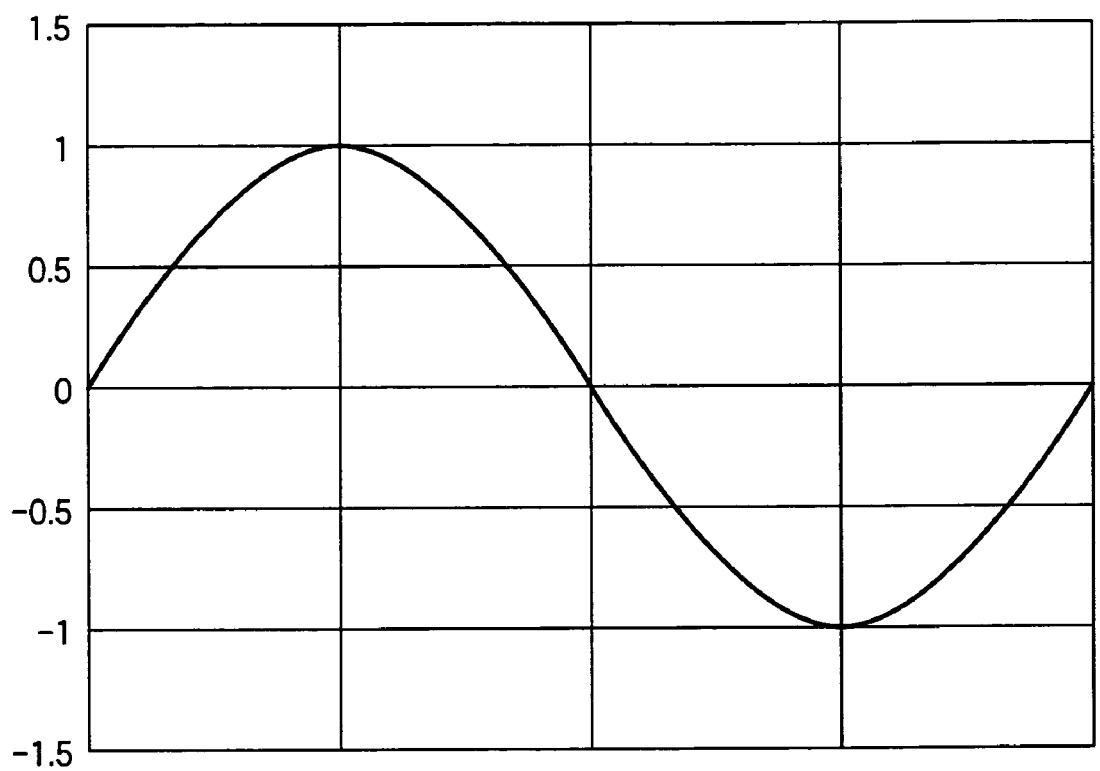
FIG. 2 shows the output waveform of a BPF 3 forming a part of an AC control section 2 in a control unit of the electric power conversion apparatus 1 according to the first embodiment of the invention.

FIG. 2 shows an output waveform of the BPF 3 forming a part of the AC control section 2 in the control unit of the electric power conversion apparatus 1 according to the first embodiment of the invention.

Next, an operation of the control unit of the electric power conversion apparatus according to the first embodiment will be discussed with reference to FIGS. 1 and 2.

A DC voltage control section 41 based on discrete system control performs proportional integration calculation of deviation between DC voltage command value Vd* set by an output voltage setting device (not shown) and DC voltage detection value Vd# output from a DC voltage detector 34, and outputs the result as AC amplitude command value 1s*. A reference sine wave generation section 42 outputs the numerical data of reference sine wave sincot having the same period and the same phase as AC voltage detection value Vs# output from an AC voltage detector 32.

Figure 4:
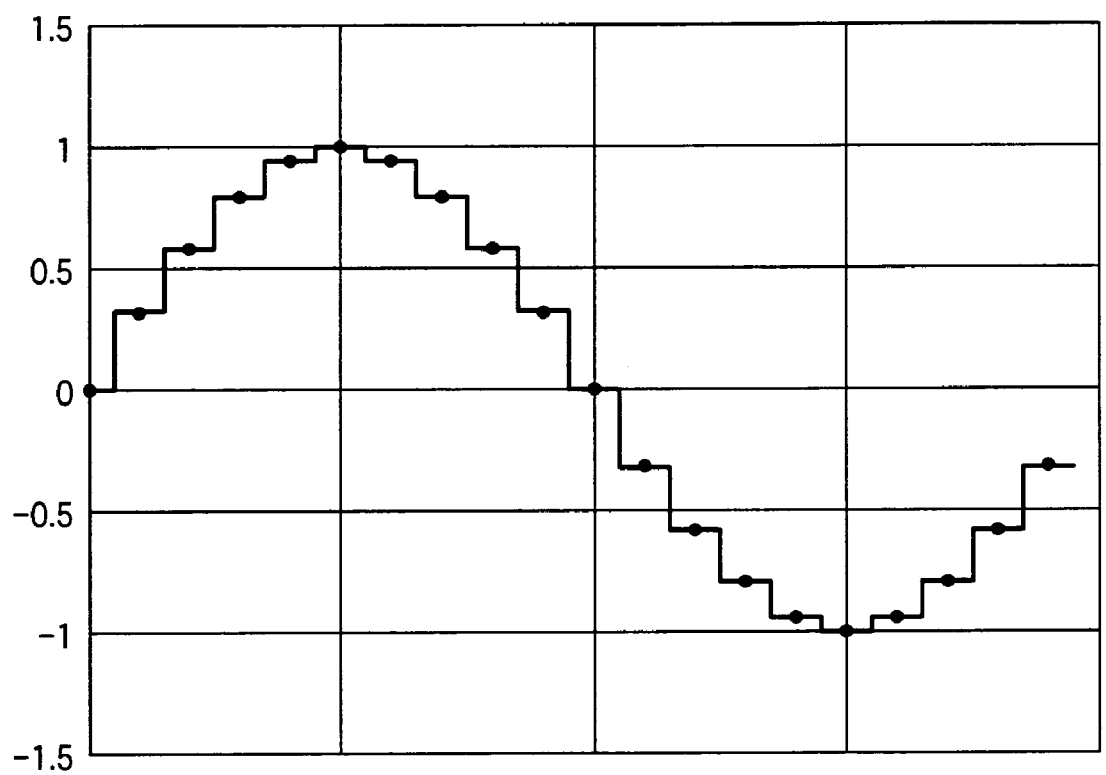
FIG. 4 shows the waveform of AC command value is* output from an AC command value calculation section 43 in a control unit 40 of the electric power conversion apparatus in the related art.

An AC command value calculation section 43 based on discrete system control multiples the AC amplitude command value 1s* by the reference sine wave sincot, and outputs the result as AC command value is*. As the AC command value is*, a constant value is output only for sample time (time delay caused by the calculation time, etc.,) Ts and thus microscopically, the waveform of the AC command value is* becomes a sine waveform changing stepwise shown in FIG. 4 (current set waveform synchronized with the power supply frequency containing the high-frequency component of the Ts period).

The AC control section 2 based on continuous system control allows only the power supply frequency component of the AC command value is* output from the AC command value calculation section 43 based on discrete system control to pass through and removes other high-frequency component superposed on the AC command value is* due to the sample time generated by the AC command value calculation section 43 based on discrete system control at the preceding stage by the BPF 3 of the band-pass filter with the power supply frequency as the center frequency and set to a gain not exceeding 1 with the power supply frequency as the center band.

Figure 5A:
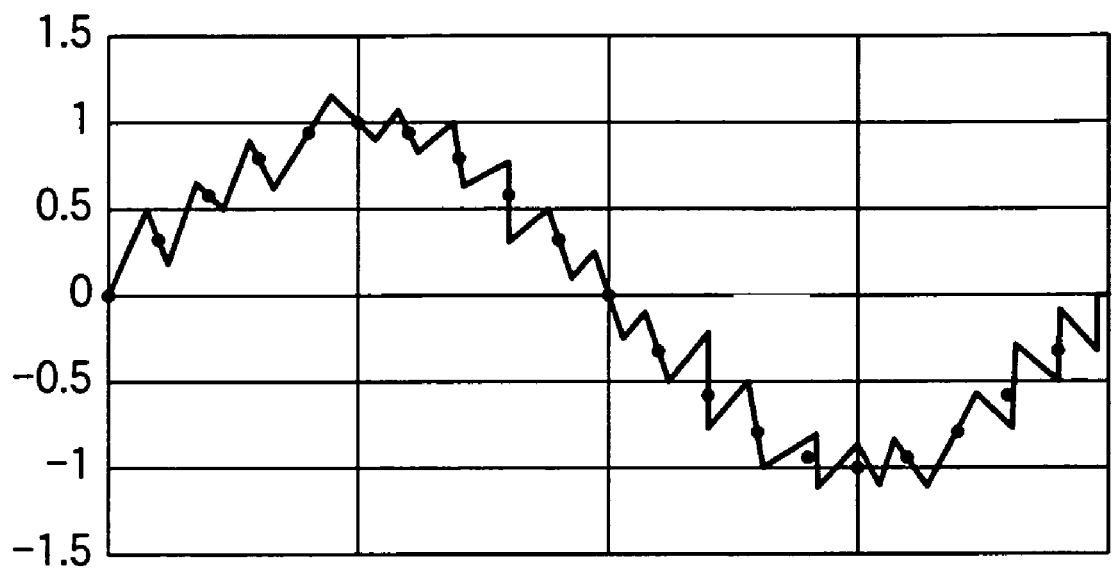
FIG. 5 shows the waveform of AC detection value is$^{\#}$ detected by an AC detector 33, high-order harmonic content superposed on an input current waveform in the control unit 40 of the electric power conversion apparatus in the related art.
Figure 5B:
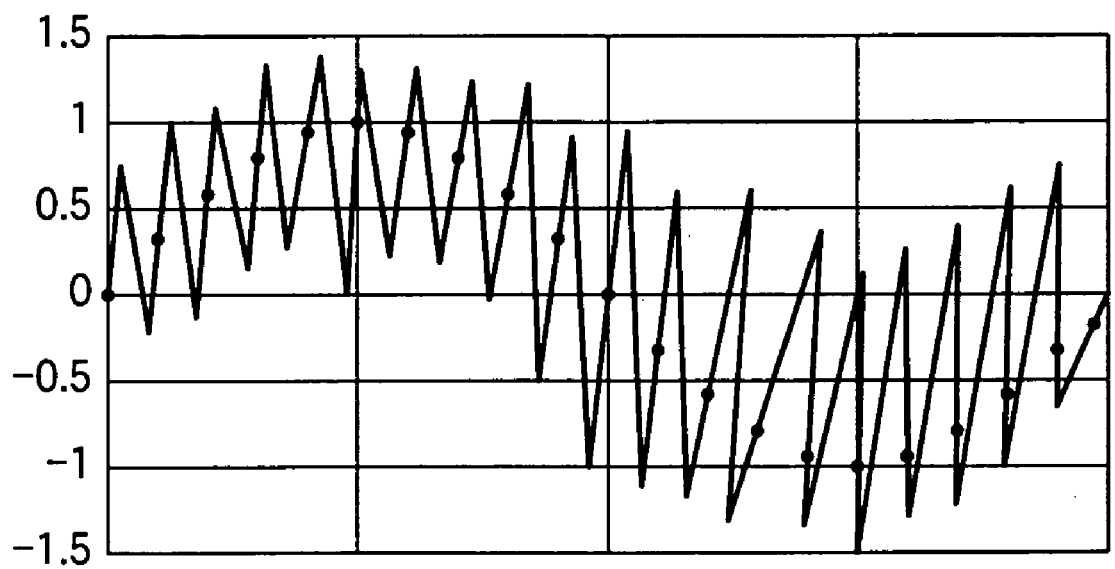

The subtraction section 4 calculates deviation ei between a signal in the vicinity of the power supply frequency of the sine waveform of the frequency almost synchronized with the power supply frequency passing through the BPF 3 (FIG. 2) and the AC detection value is# output from the AC detector 33 (FIG. 5(a)).

The proportional calculation section 5 multiplies the deviation ei calculated by the subtraction section 4 by Kp, and outputs AC voltage command value Vc*.

Even if slight distortion of the input current waveform is contained, the AC command value is* passing through the BPF 3 is the sine waveform provided by allowing only the power supply frequency component of the AC command value is* to pass through and thus the slight distortion of the input current waveform is never superposed on the AC command value is*.

Therefore, a pulse width modulation section 45 is input the AC voltage command value Vc* as the sine waveform of the frequency almost synchronized with the power supply frequency and generates an on/off signal of semiconductor switch 22a, 22b, 22c, 22d, and switch drive section 46 turns on/off the semiconductor switch 22a, 22b, 22c, 22d according to the on/off signal output from the pulse width modulation section 45, so that even if the primary wiring is long, stable DC voltage can be output.

The control unit 40 of the electric power conversion apparatus in the related art is made up of the DC voltage control section 41 based on discrete system control, the reference sine wave generation section 42, the AC command value calculation section 43, and the AC control section 44.

In contrast, in the control unit 1 of the electric power conversion apparatus according to the first embodiment of the invention, the AC control section 2 based on continuous system control having the BPF 3 of the band-pass filter with the power supply frequency as the center frequency and set to a gain not exceeding 1 with the power supply frequency as the center band is placed at the following stage of the DC voltage control section 41 based on discrete system control, the reference sine wave generation section 42, and the AC command value calculation section 43, and handles only the power supply frequency component passing through the BPF 3, of the AC command value is* output from the AC command value calculation section 43 based on discrete system control as described above, so that the high-frequency component caused by the effect of the sample time can be removed and resonance causing a high-order harmonic content to occur can be prevented even under the condition that the sample time in the discrete system control to the AC command value calculation section 43 and the time constants of the inductance component of the primary wiring and the capacitor connected as filter become equal.

Therefore, the restriction on the length of the primary wiring to avoid resonance in the electric power conversion apparatus in the related art can be eliminated.

INDUSTRIAL APPLICABILITY

As described above, the control unit of the electric power conversion apparatus of the invention can decrease the high-order harmonic content generated by resonance of the inductance component of the primary wiring and the capacitor connected as filter even if distortion occurs in the input current waveform and thus can output stable DC voltage regardless of the length of the primary wiring for connecting the AC power supply 20 and the electric power conversion apparatus and is suited for use in application wherein the installation position of the electric power conversion apparatus is limited.

The invention claimed is:

1. A control unit of an electric power conversion apparatus comprising:

a converter section having semiconductor switches forming a bridge configuration, for converting AC power of an AC power supply into DC power;

a smoothing capacitor for smoothing the DC power converted by the converter section;

a DC voltage control section for performing discrete system control of DC voltage so that the DC voltage of the smoothing capacitor matches a DC voltage command value;

a reference sine wave generation section based on discrete system control for outputting a sine wave signal used as reference based on AC voltage of the above-mentioned AC power supply;

an AC command value calculation section based on discrete system control for multiplying output of the DC voltage control section by output of the reference sine wave generation section and outputting an AC command value;

an AC control section for calculating an AC voltage command value based on the AC command value output from the AC command value calculation section and AC of the AC power supply and outputting the AC voltage command value;

a pulse width modulation section inputted the AC voltage command value, for generating an on/off signal for turning on/off the semiconductor switch based on continuous control; and a switch drive section for turning on/off the semiconductor switch in accordance with the on/off signal output from the pulse width modulation section, wherein the AC control section includes:

a band-pass filter with a power supply frequency as the center frequency and set to a gain not exceeding 1 with the power supply frequency as the center band, the band-pass filter inputted the AC command value output from the AC command value calculation section;

a subtraction section for calculating deviation between a signal passing through the band-pass filter, of the AC command value and the AC of the AC power supply; and a proportional calculation section for inputting the deviation calculated by the subtraction section and calculating an AC voltage command value reducing the deviation to zero by proportional calculation; and wherein the AC control section calculates the AC voltage command value based on continuous control.

* * * * *